United States Patent
Smit et al.

(10) Patent No.: US 12,482,557 B2
(45) Date of Patent: Nov. 25, 2025

(54) SYSTEMS AND METHODS FOR IMPROVED NON-CONTACT PATIENT MONITORING OF INCUBATED NEONATES

(71) Applicant: Covidien LP, Mansfield, MA (US)

(72) Inventors: Philip C. Smit, Hamilton (GB); Paul S. Addison, Edinburgh (GB)

(73) Assignee: Covidien LP, Mansfield, MA (US)

( * ) Notice: Subject to any disclaimer, the term of this patent is extended or adjusted under 35 U.S.C. 154(b) by 547 days.

(21) Appl. No.: 17/929,447

(22) Filed: Sep. 2, 2022

(65) Prior Publication Data

US 2023/0187058 A1 Jun. 15, 2023

Related U.S. Application Data

(60) Provisional application No. 63/265,183, filed on Dec. 9, 2021.

(51) Int. Cl.
| | |
|---|---|
| *H04N 7/18* | (2006.01) |
| *A61B 5/00* | (2006.01) |
| *A61B 5/1171* | (2016.01) |
| *G16H 40/40* | (2018.01) |
| *G16H 40/67* | (2018.01) |
| *H04N 23/611* | (2023.01) |
| *H04N 23/61* | (2023.01) |

(52) U.S. Cl.
CPC ........... *G16H 40/40* (2018.01); *A61B 5/0077* (2013.01); *A61B 5/1176* (2013.01); *A61B 5/746* (2013.01); *G16H 40/67* (2018.01); *H04N 7/183* (2013.01); *H04N 23/611* (2023.01); *A61B 2503/045* (2013.01)

(58) Field of Classification Search
USPC .......................................................... 348/77
See application file for complete search history.

(56) References Cited

U.S. PATENT DOCUMENTS

| | | | |
|---|---|---|---|
| 5,107,845 | A | 4/1992 | Guern et al. |
| 5,408,998 | A | 4/1995 | Mersch |
| 5,704,367 | A | 1/1998 | Ishikawa et al. |

(Continued)

FOREIGN PATENT DOCUMENTS

| | | |
|---|---|---|
| CA | 2234191 A1 | 10/1998 |
| CN | 106725410 A | 5/2017 |

(Continued)

OTHER PUBLICATIONS

"European Search Report", European Application No. 17156334.9, Applicant: Covidien LP, Aug. 23, 2017, 10 pages.

(Continued)

*Primary Examiner* — Nigar Chowdhury
(74) *Attorney, Agent, or Firm* — Draft Masters IP, LLC (57) ABSTRACT

System and methods for non-contact video-based patient monitoring are described. The systems and methods may include locating one or more condensation removal elements on a transparent enclosure for removal of condensation that may be obstructing the view between a video camera used to monitor a patient and the patient. The systems and methods may further include steps for monitoring the quality of the video stream and automatically initiating the condensation removal elements when a deterioration in the quality of the video stream is detected.

20 Claims, 5 Drawing Sheets

(56) References Cited

U.S. PATENT DOCUMENTS

| | | | |
|---|---|---|---|
| 5,800,360 A | 9/1998 | Kisner et al. | |
| 5,995,856 A | 11/1999 | Mannheimer et al. | |
| 6,241,684 B1 | 6/2001 | Amano et al. | |
| 6,668,071 B1 | 12/2003 | Minkin et al. | |
| 6,920,236 B2 | 7/2005 | Prokoski | |
| 7,431,700 B2 | 10/2008 | Aoki et al. | |
| 7,482,558 B2* | 1/2009 | Koch | A61G 11/00 |
| | | | 454/189 |
| 7,558,618 B1 | 7/2009 | Williams | |
| 8,149,273 B2 | 4/2012 | Liu et al. | |
| 8,754,772 B2 | 6/2014 | Horng et al. | |
| 8,792,969 B2 | 7/2014 | Bernal et al. | |
| 8,971,985 B2 | 3/2015 | Bernal et al. | |
| 9,226,691 B2 | 1/2016 | Bernal et al. | |
| 9,282,725 B2 | 3/2016 | Jensen-Jarolim et al. | |
| 9,301,710 B2 | 4/2016 | Mestha et al. | |
| 9,402,601 B1 | 8/2016 | Berger et al. | |
| 9,436,984 B2 | 9/2016 | Xu et al. | |
| 9,443,289 B2 | 9/2016 | Xu et al. | |
| 9,504,426 B2 | 11/2016 | Kyal et al. | |
| 9,508,141 B2 | 11/2016 | Khachaturian et al. | |
| 9,572,740 B2* | 2/2017 | Bodlaender | A61G 11/00 |
| 9,607,138 B1 | 3/2017 | Baldwin et al. | |
| 9,662,022 B2 | 5/2017 | Kyal et al. | |
| 9,693,693 B2 | 7/2017 | Farag et al. | |
| 9,693,710 B2 | 7/2017 | Mestha et al. | |
| 9,697,599 B2 | 7/2017 | Prasad et al. | |
| 9,750,461 B1 | 9/2017 | Telfort | |
| 9,839,756 B2 | 12/2017 | Klasek | |
| 9,943,371 B2 | 4/2018 | Bresch et al. | |
| 9,974,705 B2* | 5/2018 | Rapoport | A61G 10/00 |
| 10,213,540 B2 | 2/2019 | Burbank et al. | |
| 10,278,585 B2 | 5/2019 | Ferguson et al. | |
| 10,376,147 B2 | 8/2019 | Wood et al. | |
| 10,398,353 B2 | 9/2019 | Addison et al. | |
| 10,438,215 B2* | 10/2019 | Apokatanidis | G06Q 30/0201 |
| 10,447,972 B2 | 10/2019 | Patil | |
| 10,489,912 B1 | 11/2019 | Brailovskiy | |
| 10,523,852 B2 | 12/2019 | Tzvieli et al. | |
| 10,588,779 B2 | 3/2020 | Vorhees et al. | |
| 10,589,916 B2 | 3/2020 | Mcrae | |
| 10,646,685 B2* | 5/2020 | Rea | H05B 45/00 |
| 10,650,585 B2 | 5/2020 | Kiely | |
| 10,667,723 B2* | 6/2020 | Jacquel | A61B 5/0077 |
| 10,702,188 B2 | 7/2020 | Addison et al. | |
| 10,729,357 B2 | 8/2020 | Larson et al. | |
| 10,874,331 B2 | 12/2020 | Kaiser et al. | |
| 10,921,763 B1* | 2/2021 | Correnti | G05D 1/0011 |
| 10,937,296 B1 | 3/2021 | Kukreja et al. | |
| 10,939,824 B2 | 3/2021 | Addison et al. | |
| 10,939,834 B2 | 3/2021 | Khwaja et al. | |
| 10,966,059 B1 | 3/2021 | Dayal et al. | |
| 11,311,252 B2 | 4/2022 | Jacquel et al. | |
| 11,315,275 B2 | 4/2022 | Addison et al. | |
| 11,317,828 B2 | 5/2022 | Addison et al. | |
| 11,350,850 B2 | 6/2022 | Jacquel et al. | |
| 11,540,027 B2* | 12/2022 | Guzik | H04N 21/64707 |
| 11,850,026 B2 | 12/2023 | Levi et al. | |
| 12,076,270 B2* | 9/2024 | Van Den Bossche | A61M 16/1005 |
| 12,079,993 B1* | 9/2024 | Lochner | G16H 30/40 |
| 2002/0137464 A1 | 9/2002 | Dolgonos et al. | |
| 2004/0001633 A1 | 1/2004 | Caviedes | |
| 2004/0258285 A1 | 12/2004 | Hansen et al. | |
| 2005/0203348 A1 | 9/2005 | Shihadeh et al. | |
| 2007/0116328 A1 | 5/2007 | Sablak et al. | |
| 2008/0001735 A1 | 1/2008 | Tran | |
| 2008/0108880 A1 | 5/2008 | Young et al. | |
| 2008/0279420 A1 | 11/2008 | Masticola et al. | |
| 2008/0295837 A1 | 12/2008 | Mccormick et al. | |
| 2009/0024012 A1 | 1/2009 | Li et al. | |
| 2009/0141124 A1 | 6/2009 | Liu et al. | |
| 2009/0304280 A1 | 12/2009 | Aharoni et al. | |
| 2010/0080431 A1* | 4/2010 | Datema | A61B 5/6887 |
| | | | 5/601 |
| 2010/0210924 A1 | 8/2010 | Parthasarathy et al. | |
| 2010/0236553 A1 | 9/2010 | Jafari et al. | |
| 2010/0249630 A1 | 9/2010 | Droitcour et al. | |
| 2010/0324437 A1 | 12/2010 | Freeman et al. | |
| 2011/0144517 A1 | 6/2011 | Cervantes | |
| 2011/0150274 A1 | 6/2011 | Patwardhan et al. | |
| 2012/0065533 A1 | 3/2012 | Carrillo et al. | |
| 2012/0075464 A1 | 3/2012 | Derenne et al. | |
| 2012/0191165 A1* | 7/2012 | Koch | A61G 11/00 |
| | | | 607/96 |
| 2012/0195473 A1 | 8/2012 | De Haan et al. | |
| 2012/0215054 A1* | 8/2012 | Rodrigues | A61G 11/00 |
| | | | 600/22 |
| 2012/0243797 A1 | 9/2012 | Di Venuto Dayer et al. | |
| 2012/0249567 A1* | 10/2012 | Bocirnea | G06F 3/14 |
| | | | 345/581 |
| 2013/0073312 A1 | 3/2013 | Thompson et al. | |
| 2013/0083892 A1* | 4/2013 | Ohta | A61B 6/548 |
| | | | 250/394 |
| 2013/0267873 A1 | 10/2013 | Fuchs | |
| 2013/0271591 A1 | 10/2013 | Van Leest et al. | |
| 2013/0272393 A1 | 10/2013 | Kirenko et al. | |
| 2013/0275873 A1 | 10/2013 | Shaw et al. | |
| 2013/0324830 A1 | 12/2013 | Bernal et al. | |
| 2013/0324876 A1* | 12/2013 | Bernal | A61B 5/1135 |
| | | | 600/538 |
| 2014/0023235 A1 | 1/2014 | Cennini et al. | |
| 2014/0052006 A1 | 2/2014 | Lee et al. | |
| 2014/0053840 A1 | 2/2014 | Liu | |
| 2014/0073860 A1 | 3/2014 | Urtti | |
| 2014/0139405 A1 | 5/2014 | Ribble et al. | |
| 2014/0140592 A1 | 5/2014 | Lasenby et al. | |
| 2014/0235976 A1 | 8/2014 | Bresch et al. | |
| 2014/0267718 A1 | 9/2014 | Govro et al. | |
| 2014/0272860 A1 | 9/2014 | Peterson et al. | |
| 2014/0275832 A1 | 9/2014 | Muehlsteff et al. | |
| 2014/0276104 A1 | 9/2014 | Tao et al. | |
| 2014/0330336 A1 | 11/2014 | Errico et al. | |
| 2014/0334697 A1 | 11/2014 | Kersten et al. | |
| 2014/0358017 A1 | 12/2014 | Op Den Buijs et al. | |
| 2014/0378810 A1 | 12/2014 | Davis et al. | |
| 2014/0379369 A1 | 12/2014 | Kokovidis et al. | |
| 2015/0003723 A1 | 1/2015 | Huang et al. | |
| 2015/0068069 A1 | 3/2015 | Tran et al. | |
| 2015/0094597 A1 | 4/2015 | Mestha et al. | |
| 2015/0131880 A1 | 5/2015 | Wang et al. | |
| 2015/0157269 A1 | 6/2015 | Lisogurski et al. | |
| 2015/0198707 A1 | 7/2015 | Al-Alusi | |
| 2015/0223731 A1 | 8/2015 | Sahin | |
| 2015/0238550 A1 | 8/2015 | Subramaniam | |
| 2015/0265187 A1 | 9/2015 | Bernal et al. | |
| 2015/0282724 A1 | 10/2015 | Mcduff et al. | |
| 2015/0286779 A1 | 10/2015 | Bala et al. | |
| 2015/0301590 A1 | 10/2015 | Furst et al. | |
| 2015/0317814 A1 | 11/2015 | Johnston et al. | |
| 2015/0379370 A1 | 12/2015 | Clifton et al. | |
| 2016/0000335 A1 | 1/2016 | Khachaturian et al. | |
| 2016/0030264 A1* | 2/2016 | Lehmann | A61M 16/0051 |
| | | | 600/22 |
| 2016/0030616 A1* | 2/2016 | Nariyuki | A01N 25/34 |
| | | | 600/22 |
| 2016/0049094 A1 | 2/2016 | Gupta et al. | |
| 2016/0078301 A1* | 3/2016 | Yamamoto | G06V 40/10 |
| | | | 382/103 |
| 2016/0081582 A1* | 3/2016 | Rapoport | G01R 33/30 |
| | | | 600/415 |
| 2016/0082222 A1 | 3/2016 | Garcia Molina et al. | |
| 2016/0140828 A1 | 5/2016 | Deforest | |
| 2016/0143598 A1 | 5/2016 | Rusin et al. | |
| 2016/0151022 A1 | 6/2016 | Berlin et al. | |
| 2016/0156835 A1 | 6/2016 | Ogasawara et al. | |
| 2016/0174887 A1 | 6/2016 | Kirenko et al. | |
| 2016/0206493 A1* | 7/2016 | Rapoport | A61M 16/161 |
| 2016/0210747 A1 | 7/2016 | Hay et al. | |
| 2016/0235344 A1 | 8/2016 | Auerbach | |
| 2016/0310084 A1 | 10/2016 | Banerjee et al. | |
| 2016/0317041 A1 | 11/2016 | Porges et al. | |
| 2016/0345931 A1 | 12/2016 | Xu et al. | |

(56) References Cited

U.S. PATENT DOCUMENTS

| | | |
|---|---|---|
| 2016/0367186 A1 | 12/2016 | Freeman et al. |
| 2016/0379353 A1* | 12/2016 | Makifuchi ........... A61B 6/5264 |
| | | 382/131 |
| 2017/0007342 A1 | 1/2017 | Kasai et al. |
| 2017/0007795 A1 | 1/2017 | Pedro et al. |
| 2017/0055877 A1 | 3/2017 | Niemeyer |
| 2017/0065484 A1 | 3/2017 | Addison et al. |
| 2017/0071516 A1 | 3/2017 | Bhagat et al. |
| 2017/0095215 A1 | 4/2017 | Watson et al. |
| 2017/0095217 A1 | 4/2017 | Hubert et al. |
| 2017/0119340 A1 | 5/2017 | Nakai et al. |
| 2017/0130188 A1* | 5/2017 | Ue .......................... H04N 23/51 |
| 2017/0147772 A1 | 5/2017 | Meehan et al. |
| 2017/0164904 A1 | 6/2017 | Kirenko |
| 2017/0172434 A1 | 6/2017 | Amelard et al. |
| 2017/0173262 A1 | 6/2017 | Veltz |
| 2017/0238805 A1 | 8/2017 | Addison et al. |
| 2017/0238842 A1 | 8/2017 | Jacquel et al. |
| 2017/0311887 A1 | 11/2017 | Leussler et al. |
| 2017/0319114 A1* | 11/2017 | Kaestle .............. A61B 5/14557 |
| 2018/0042486 A1 | 2/2018 | Yoshizawa et al. |
| 2018/0042500 A1 | 2/2018 | Liao et al. |
| 2018/0049669 A1 | 2/2018 | Vu et al. |
| 2018/0053392 A1* | 2/2018 | White .................. A61B 5/1128 |
| 2018/0082417 A1* | 3/2018 | Clynne .................. H04N 23/51 |
| 2018/0096477 A1* | 4/2018 | Avila ..................... A61B 6/583 |
| 2018/0104426 A1 | 4/2018 | Oldfield et al. |
| 2018/0106897 A1 | 4/2018 | Shouldice et al. |
| 2018/0169361 A1 | 6/2018 | Dennis et al. |
| 2018/0217660 A1 | 8/2018 | Dayal et al. |
| 2018/0228381 A1 | 8/2018 | Leboeuf et al. |
| 2018/0247713 A1* | 8/2018 | Rothman ........... A61B 5/02055 |
| 2018/0303351 A1 | 10/2018 | Mestha et al. |
| 2018/0310844 A1 | 11/2018 | Tezuka et al. |
| 2018/0325420 A1 | 11/2018 | Gigi |
| 2018/0333050 A1 | 11/2018 | Greiner et al. |
| 2018/0333102 A1 | 11/2018 | De Haan et al. |
| 2018/0352150 A1 | 12/2018 | Purwar et al. |
| 2019/0050985 A1 | 2/2019 | Den Brinker et al. |
| 2019/0133499 A1 | 5/2019 | Auerbach |
| 2019/0142274 A1 | 5/2019 | Addison et al. |
| 2019/0199970 A1 | 6/2019 | Greiner et al. |
| 2019/0209046 A1 | 7/2019 | Addison et al. |
| 2019/0209083 A1 | 7/2019 | Wu et al. |
| 2019/0307365 A1 | 10/2019 | Addison et al. |
| 2019/0311101 A1 | 10/2019 | Nienhouse |
| 2019/0343480 A1 | 11/2019 | Shute et al. |
| 2019/0369553 A1* | 12/2019 | Kasahara ................ G03G 21/20 |
| 2019/0380599 A1 | 12/2019 | Addison et al. |
| 2019/0380807 A1 | 12/2019 | Addison et al. |
| 2020/0046302 A1 | 2/2020 | Jacquel et al. |
| 2020/0187827 A1 | 6/2020 | Addison et al. |
| 2020/0202154 A1 | 6/2020 | Wang et al. |
| 2020/0205734 A1 | 7/2020 | Mulligan et al. |
| 2020/0237225 A1 | 7/2020 | Addison et al. |
| 2020/0242790 A1 | 7/2020 | Addison et al. |
| 2020/0250406 A1 | 8/2020 | Wang et al. |
| 2020/0253560 A1 | 8/2020 | De Haan |
| 2020/0279464 A1 | 9/2020 | Llewelyn |
| 2020/0289024 A1 | 9/2020 | Addison et al. |
| 2020/0319217 A1* | 10/2020 | Verhoef ................. H04N 7/183 |
| 2020/0329976 A1 | 10/2020 | Chen et al. |
| 2020/0379398 A1* | 12/2020 | Baba ....................... G02B 26/10 |
| 2020/0409383 A1 | 12/2020 | Maunder |
| 2021/0068670 A1 | 3/2021 | Redtel |
| 2021/0142874 A1 | 5/2021 | Llewelyn |
| 2021/0153746 A1 | 5/2021 | Addison et al. |
| 2021/0164014 A1* | 6/2021 | Typas ..................... A61K 31/357 |
| 2021/0189475 A1* | 6/2021 | Tentori ................. C12Q 1/6841 |
| 2021/0201517 A1 | 7/2021 | Yang et al. |
| 2021/0233631 A1 | 7/2021 | Llewelyn |
| 2021/0235992 A1 | 8/2021 | Addison |
| 2021/0236026 A1* | 8/2021 | Davis .................... A61B 5/1128 |
| 2021/0295662 A1 | 9/2021 | Bugbee et al. |
| 2021/0313075 A1 | 10/2021 | Mc Namara et al. |
| 2022/0211296 A1 | 7/2022 | Addison et al. |
| 2023/0122367 A1 | 4/2023 | Tesar |
| 2023/0157552 A1* | 5/2023 | Thuering ............. A61B 5/0205 |
| | | 600/301 |

FOREIGN PATENT DOCUMENTS

| | | |
|---|---|---|
| CN | 111728602 A | 10/2020 |
| CN | 112233813 A | 1/2021 |
| DE | 19741982 A1 | 10/1998 |
| EP | 2793189 B1 | 11/2016 |
| EP | 2428162 B1 | 8/2017 |
| EP | 3207862 A1 | 8/2017 |
| EP | 3207863 A1 | 8/2017 |
| EP | 3384827 A1 | 10/2018 |
| EP | 2772828 B1 | 1/2019 |
| JP | 2004173010 A | 6/2004 |
| JP | 2004283373 A | 10/2004 |
| JP | 3744778 B2 | 12/2005 |
| JP | 2009544080 A | 12/2009 |
| JP | 2011130996 A | 7/2011 |
| KR | 101644843 B1 | 8/2016 |
| RS | 20120373 A1 | 4/2014 |
| WO | 2004100067 A2 | 11/2004 |
| WO | 2005079658 A2 | 9/2005 |
| WO | 2010034107 A1 | 4/2010 |
| WO | 2010036653 A1 | 4/2010 |
| WO | 2015059700 A1 | 4/2015 |
| WO | 2015078735 A1 | 6/2015 |
| WO | 2015110859 A1 | 7/2015 |
| WO | 2016065411 A1 | 5/2016 |
| WO | 2016178141 A1 | 11/2016 |
| WO | 2016209491 A1 | 12/2016 |
| WO | 2017060463 A1 | 4/2017 |
| WO | 2017089139 A1 | 6/2017 |
| WO | 2017100188 A2 | 6/2017 |
| WO | 2017144934 A1 | 8/2017 |
| WO | 2018042376 A1 | 3/2018 |
| WO | 2019094893 A1 | 5/2019 |
| WO | 2019135877 A1 | 7/2019 |
| WO | 2019240991 A1 | 12/2019 |
| WO | 2020033613 A1 | 2/2020 |
| WO | 2021044240 A1 | 3/2021 |

OTHER PUBLICATIONS

"European Search Report", European Patent Application No. 17156337. 2, Applicant: Covidien LP, Aug. 23, 2017, 10 pages.
"International Search Report and Written Opinion", International Application No. PCT/US2021/015669, Apr. 12, 2021, 15 pages.
"International Search Report and Written Opinion", International Application No. PCT/US2018/060648, Jan. 28, 2019, 17 pages.
"International Search Report and Written Opinion", International Application No. PCT/US2018/065492, Mar. 8, 2019, 12 pages.
"International Search Report and Written Opinion", International Application No. PCT/US2019/035433, Nov. 11, 2019, 17 pages.
"International Search Report and Written Opinion", International Application No. PCT/US2019/045600, Oct. 23, 2019, 19 pages.
"Invitation to Pay Additional Fees and Partial International Search Report", International Application No. PCT/US2019/035433, Sep. 13, 2019, 16 pages.
"Medical Electrical Equipment, Part 2-61: Particular requirements for basic safety and essential performance of pulse oximeter equipment", BSI Standards Publication, BS EN ISO 80601-2-61, 2011, 98 pages.
Aarts, Lonneke A.M., et al., "Non-contact heart rate monitoring utilizing camera photoplethysmography in neonatal Intensive care unit—A Pilot Study", Early Human Development 89, 2013, pp. 943-948, 6 pages.
Abbas, A.K., et al., "Neonatal non-contact respiratory monitoring based on real-time infrared thermography", Biomed. Eng. Online, vol. 10, No. 93, 2011, 17 pages.
Addison, Paul S., "A Review of Signal Processing Used in the Implementation of the Pulse Oximetry Photoplethysmographic Fluid Responsiveness Parameter", International Anesthesia Research Society, vol. 119, No. 6, Dec. 2014, pp. 1293-1306, 14 pages.

(56) References Cited

OTHER PUBLICATIONS

Addison, Paul S., et al., "Developing an algorithm for pulse oximetry derived respirator rate (RRoxi): a healthy volunteer study", J Clin comput, No. 26, 2012, pp. 45-51, 7 pages.
Addison, Paul S., et al., "Pulse oximetry-derived respiratory rate in general care floor patients", J. Clin Monit Comput, No. 29, 2015, pp. 113-120, 8 pages.
Addison, P.S., et al., "Video-based Heart Rate Monitoring across a Range of Skin Pigmentations during an Acute Hypoxic Challenge", J Clin Monit Comput, vol. 9, Nov. 9, 2017, 15 pages.
Amazon, "Dockem Koala Tablet Wall Mount Dock for ipad Air/Mini/Pro, Samsung Galaxy Tab/Note, Nexus 7/10, and More (Black Brackets, Screw-in Version)", https://www.amazon.com/Tablet-Dockem-Samsung-Brackets-Version-dp/B00JV75FC6?th=1, First available Apr. 22, 2014, viewed on Nov. 16, 2021, Apr. 22, 2014, 4 pages.
Amelard, et al., "Non-contact transmittance photoplethysmographic imaging (PPGI) for long-distance cardiovascular monitoring", ResearchGate, XP055542534 [Retrieved online Jan. 15, 2019], Mar. 23, 2015, pp. 1-13, 14 pages.
Armanian, A. M., "Caffeine administration to prevent apnea in very premature infants", Pediatrics & Neonatology, 57(5), 2016, pp. 408-412, 5 pages.
Barone, S, et al., "Computer-aided modelling of three-dimensional maxillofacial tissues through multi-modal maging", Proceedings of the Institution of Mechanical Engineers, Journal of Engineering in Medicine, Part H vol. 227, No. 2, Feb. 1, 2013, 1 page.
Barone, S, et al., "Creation of 3D Multi-body Orthodontic Models by Using Independent Imaging Sensors", Senros MDPI AG Switzerland, vol. 13, No. 2, Jan. 1, 2013, pp. 2033-2050, 18 pages.
Bartula, M., et al., "Camera-based System for Sontactless Monitoring of Respiration", 2013 35th Annual International Conference of the IEEE Engineering in Medicine and Biology Society (EMBC), Jul. 3, 2013, pp. 2672-2675, 4 pages.
Bhattacharya, S., et al., "A Novel Classification Method for Predicting Acute Hypotensive Episodes in Critical Care", 5th ACM Conference on Bioinformatics, Computational Bilogy and Health Informatics (ACM-BCB 2014), Newport Beach, USA, 2014, 10 pages.
Bhattacharya, S., et al., "Unsupervised learning using Gaussian Mixture Copula models", 21st International Conference on Computational Statistics (COMPSTAT 2014), Geneva, Switzerland, 2014, pp. 523-530, 8 pages.
Bickler, Philip E., et al., "Factors Affecting the Performance of 5 Cerebral Oximeters During Hypoxia in Healthy Volunteers", Society for Technology in Anesthesia, vol. 117, No. 4, Oct. 2013, pp. 813-823, 11 pages.
Bousefsaf, Frederic, et al., "Continuous wavelet filtering on webcam photoplethysmographic signals to remotely assess the instantaneous heart rate", Biomedical Signal Processing and Control 8, 2013, pp. 568-574, 7 pages.
Bruser, C., et al., "Adaptive Beat-to-Beat Heart Rate Estimation in Ballistocardiograms", IEEE Transactions Information Technology in Biomedicine, vol. 15, No. 5, Sep. 2011, pp. 778-786, 9 pages.
Cennini, Giovanni, et al., "Heart rate monitoring via remote photoplethysmography with motion artifacts reduction", Optics Express, vol. 18, No. 5, Mar. 1, 2010, pp. 4867-4875, 9 pages.
Colantonio, S., et al., "A smart mirror to promote a healthy lifestyle", Biosystems Engineering. vol. 138, Innovations in Medicine and Healthcare, Oct. 2015, pp. 33-43, 11 pages.
Cooley, et al., "An Alorithm for the Machine Calculation of Complex Fourier Series", Aug. 17, 1964, pp. 297-301, 5 pages.
Di Fiore, J.M., et al., "Intermittent hypoxemia and oxidative stress in preterm infants", Respiratory Physiology & Neurobiology, No. 266, 2019, pp. 121-129, 25 pages.
Fei, J., et al., "Thermistor at a distance: unobtrusive measurement of breathing", IEEE Transactions on Biomedical Engineering, vol. 57, No. 4, 2010, pp. 968-998, 11 pages.

Feng, Litong, et al., "Dynamic ROI based on K-means for remote photoplethysmography", IEE International Conference on Accoustics, Speech and Signal Processing (ICASSP), Apr. 2015, pp. 1310-1314, 5 pages.
Fischer, et al., "ReMoteCare: Health Monitoring with Streaming Video", OCMB '08, 7th International Conference on Mobile Business, IEEE, Piscataway, NJ,, Jul. 7, 2008, pp. 280-286.
George, et al., "Respiratory Rate Measurement From PPG Signal Using Smart Fusion Technique", International Conference on Engineering Trends and Science & Humanities (ICETSH-2015), 2015, 5 pages.
Goldman, L.J., "Nasal airflow and thoracoabdominal motion in children using infrared thermographic video processing", Pediatric Pulmonology, vol. 47, No. 5, 2012, pp. 476-486, 11 pages.
Grimm, T., et al., "Sleep position classification from a depth camera using bed aligned maps", 23rd International Conference on Pattern Recognition (ICPR), Dec. 2016, pp. 319-324, 6 pages.
GSMARENA, "Apple iPad Pro 11 (2018)", https://www.gsmarena.com/apple_ipad_pro_11_(2018)-9386.pjp, viewed on Nov. 16, 2021, 1 page.
Guazzi, Alessandro R., et al., "Non-contact measurement of oxygen saturation with an RGB camera", Biomedical Optics Express, vol. 6, No. 9, Sep. 1, 2015, pp. 3320-3338, 19 pages.
Han, J., et al., "Visible and infrared image registration in man-made environments employing hybrid visuals features", Pattern Recognition Letters, vol. 34, No. 1, 2013, pp. 42-51, 10 pages.
Huddar, V., et al., "Predicting Postoperative Acute Respiratory Failure in Critical Care using Nursing Notes and Physiological Signals", 36th Annual International Conference of IEEE Engineering in Medicine and Biology Society (IEEE EMBC 2014), Chicago, USA, 2014, pp. 2702-2705, 4 pages.
Hyvarinen, A., et al., "Independent Component Analysis: Algorithms and Applications", Neural Networks, vol. 13, No. 4, 2000, pp. 411-430, 31 pages.
Javadi, M., et al., "Diagnosing Pneumonia in Rural Thailand: Digital Cameras versus Film Digitizers for Chest Radiograph Teleradiology", International Journal of Infectious Disease, 10(2), Mar. 2006, pp. 129-135, 7 pages.
Jopling, M. W., et al., "Issues in the Laboratory Evaluation of Pulse Oximeter Performance", Anesth. Analg., No. 94, 2002, pp. S62-S68, 7 pages.
Kastle, Siegfried W., et al., "Determining the Artifact Sensitivity of Recent Pulse Oximeters During Laboratory Benchmarking", Journal of Clinical Monitoring and Computing, vol. 16, No. 7, 2000, pp. 509-552, 14 pages.
Klaessens, J.H.G.M., et al., "Non-invasive skin oxygenation imaging using a multi-spectral camera system: Effectiveness of various concentration algorithms applied on human skin", Proc. of SPIE, vol. 7174 717408-1, 2009, 14 pages.
Kong, Lingqin, et al., "Non-contact detection of oxygen saturation based on visible light imaging device using ambient light", Optics Express, vol. 21, No. 15, Jul. 29, 2013, pp. 17646-17471, 8 pages.
Kortelainen, J.M., et al., "Sleep staging based on signals acquired through bed sensor", IEEE Transactions on Informational Technology in Biomedicine, vol. 14, No. 3, May 2010, pp. 776-785, 10 pages.
Kumar, M., et al., "Distance PPG: Robust non-contact vital signs monitoring using a camera", Biomedical Optics Express, vol. 6, No. 5, May 1, 2015, 24 pages.
Kwon, Sungjun, et al., "Validation of heart rate extraction using video imaging on a built-in camera system of a smartphone", 34th Annual International Conference of the IEEE EMBS, San Diego, CA, USA, Aug. 28-Sep. 1, 2012, pp. 2174-2177, 4 pages.
Lai, C.J., et al., "Heated humidified high-flow nasal oxygen prevents intraoperative body temperature decrease in non-intubated thoracoscopy", Journal of Anesthesia, Oct. 15, 2018, 8 pages.
Sokooti, Hess, et al., "Hierarchical Prediction of Registration Misalignment Using a Convolutional LSTM: Application to Chest CT Scans", IEEE Access, IEEE, USA, vol. 9, Apr. 20, 2021, 62008-62020, 13 pages.
Al-Naji, Ali, et al., "Real Time Apnoea Monitoring of Children Using the Microsoft Kinect Sensor: A Pilot Study", Sensors, 17(286), Feb. 3, 2017, 15 pages.

(56) References Cited

OTHER PUBLICATIONS

Harte, James M., et al., "Chest wall motion analysis in healthy volunteers and adults with cystic fibrosis using a novel Kinect-based motion tracking system", Medical & Biological Engineering & Computing, 54(11), Feb. 13, 2016, pp. 1631-1640, 11 pages.

Lawrence, E., et al., "Data Collection, Correlation and Dissemination of Medical Sensor information in a WSN", IEEE 2009 Fifth International Conference on Networking and Services, 978-0-7695-3586-9/09, Apr. 20, 2009, pp. 402-408, 7 pages.

Li, et al., "A Non-Contact Vision-Based System for Respiratory Rate Estimation", IEEE 978-1-4244-7929-0/14, 2014, pp. 2119-2122, 4 pages.

Liu, H., et al., "A Novel Method Based on Two Cameras for Accurate Estimation of Arterial Oxygen Saturation", BioMedical Engineering Online, vol. 14, No. 52, 2015, 18 pages.

Liu, S., et al., "In-bed pose estimation: Deep learning with shallow dataset. IEEE journal of translational engineering in health and medicine", IEEE Journal of Translational Engineering in Health and Medicine, No. 7, 2019, pp. 1-12, 12 pages.

Liu, C., et al., "Motion Magnification", ACM Transactions on Graphics (TOG), vol. 24, No. 3, 2005, pp. 519-526, 8 pages.

LV, et al., "Class Energy Image Analysis for Video Sensor-Based Gait Recognition: A Review", Sensors, No. 15, 2015, pp. 932-964, 33 pages.

Mcduff, Daniel J., et al., "A Survey of Remote Optical Photoplethysmographic Imaging Methods", IEEE 987-1-4244-0270-1/15, 2015, pp. 6398-6404, 7 pages.

Mestha, L.K., et al., "Towards Continuous Monitoring of Pulse Rate in Neonatal Intensive Care Unit with a Webcam", Proc. of 36th Annual Int. Conf. of the IEEE Engineering in Medicine and Biology Society, Chicago, IL, 2014, pp. 3817-3820, 4 pages.

Mukherjee, S., et al., "Patient health management system using e-health monitoring architecture", IEEE, International Advance Computing Conference (IACC), 978-1-4799-2572-8/14, Feb. 21, 2014, pp. 400-405, 6 pages.

Nguyen, et al., "3D shape, deformation and vibration measurements using infrared Kinect sensors and digital image correlation", Applied Optics, vol. 56, No. 32, Nov. 10, 2017, 8 pages.

Ni, et al., "RGBD-Camera Based Get-Up Event Detection for Hospital Fall Prevention", Acoustics, Speech and Signal Processing (ICASSP) 2012 IEEE International Conf., Mar. 2012, pp. 1405-1408, 6 pages.

Nisar, et al., "Contactless heart rate monitor for multiple persons in a video", IEEE International Conference on Consumer Electronics—Taiwan (ICCE-TW), XP03291229 [Retreived on Jul. 25, 2016], May 27, 2016, 2 pages.

Pereira, C., et al., "Noncontact Monitoring of Respiratory Rate in Newborn Infants Using Thermal Imaging", IEEE Transactions on Biomedical Engineering, Aug. 23, 2018, 10 pages.

Poh, et al., "Advancements in Noncontact, Multiparameter Physiological Measurements Using a Webcam", IEEE Transactions on Biomedical Engineering, vol. 58, No. 1, Jan. 2011, pp. 7-11, 5 pages.

Poh, et al., "Non-contact, automated cardiac pulse measurements using video imaging and blind source separation", OPT. Express 18, 2010, pp. 10762-10774, 14 pages.

Povsic, Klemen, et al., "Real-Time 3D visualization of the thoraco-abdominal surface during breathing with body movement and deformation extraction", Physiological Measurement, vol. 36, No. 7, May 28, 2015, pp. 1497-1516, 22 pages.

Prochazka, et al., "Microsoft Kinect Visual and Depth Sensors for Breathing and Heart Rate Analysis", Senors, vol. 16, No. 7, Jun. 28, 2016, 11 pages.

Rajan, V., et al., "Clinical Decision Support for Stroke using Multiview Learning based Models for NIHSS Scores", PAKDD 2016 Workshop: Predictive Analytics in Critical Care (PACC), Auckland, New Zealand, 2016, pp. 190-199, 10 pages.

Rajan, V., et al., "Dependency Clustering of Mixed Data with Gaussian Mixture Copulas", 25th International Joint Conference on Artificial Intelligence IJCAI, New York, USA, 2016, pp. 1967-1973, 7 pages.

Reisner, A., et al., "Utility of the Photoplethysmogram in Circulatory Monitoring", American Society of Anesthesiologist, May 2008, pp. 950-958, 9 pages.

Reyes, B.A., et al., "Tidal Volume and Instantaneous Respiration Rate Estimation using a Volumetric Surrogate Signal Acquired via a Smartphone Camera", IEEE Journal of Biomedical and Health Informatics, vol. 21(3), Feb. 25, 2016, pp. 764-777, 15 pages.

Rougier, Caroline, et al., "Robust Video Surveillance for Fall Detection Based on Human Shape Deformation", IEEE Transactions on Circuits and Systems for Video Technology, vol. 21, No. 5, May 2011, pp. 611-622, 12 pages.

Rubinstein, M, "Analysis and Visualization of Temporal Variations in Video", Department of Electrical Engineering and Computer Science, Massachusetts Institute of Technology, Feb. 2014, 118 pages.

Scalise, Lorenzo, et al., "Heart rate measurement in neonatal patients using a webcamera", Department of Industrial Engineering and Mathematical Science, Italy, 978-1-4673-0882-3/12, EEE, 2012, 4 pages.

Schaerer, J., et al., "Multi-dimensional respiratory motion tracking from markerless optical surface imaging based on deformable mesh registration", Physics in Medicine and Biology, vol. 57, No. 2, Dec. 14, 2011, pp. 357-373, 18 pages.

Sengupta, A., et al., "A Statistical Model for Stroke Outcome Prediction and Treatment Planning", 38th Annual International Conference of the IEE Engineering in Medicine and Biology (Society IEEE EMBC2016), Orlando, USA, 2016, pp. 2516-2519, 4 pages.

Shah, Nitin, et al., "Performance of three new-generation pulse oximeters during motion and low perfursion in volunteers", Journal of Clinical Anesthesia, No. 24, 2012, pp. 385-391, 7 pages.

Shao, Dangdang, et al., "Noncontact Monitoring Breathing Pattern, Exhalation Flow Rate and Pulse Transit Time", EEE Transactions on Biomedical Engineering, vol. 61, No. 11, Nov. 2014, pp. 2760-2767, 8 pages.

Shrivastava, H., et al., "Classification with Imbalance: A Similarity-based Method for Predicting Respiratory Failure", IEEE International Conference on Bioinformatics and Biomedicine (IEEE BIBM2015), Washington, DC,USA, 2015, pp. 707-714, 8 pages.

Srinivas, J., et al., "A Mutual Authentication Framework for Wireless Medical Sensor Networks", Journal of Medical Systems, 41:80, 2017, pp. 1-19, 19 pages.

Sun, Yu, et al., "Motion-compensated noncontact imaging photoplethysmography to monitor cardiorespiratory status during exercise", Journal of Biomedical Optics, vol. 16, No. 7, Jul. 1, 2011, 10 pages.

Sun, Yu, et al., "Noncontact imaging photoplethysmography to effectively access pulse rate variability", Journal of Biomedical Optics, vol. 18(6), Jun. 2013, 10 pages.

Tamura, et al., "Wearable Photoplethysmographic Sensors—Past & Present", Electronics, vol. 3, 2014, pp. 282-302, 21 pages.

Tarassenko, L., et al., "Non-contact video-based vital sign monitoring using ambient light and auto-regressive models", Institute of Physics and Engineering in Medicine, vol. 35, 2014, pp. 807-831, 26 pages.

Teichmann, D., et al., "Non-Contact monitoring techniques—Principles and applications", In Proc. of IEEE International Conference of the Engineering in Medicine and Biology Society (EMBC), San Diego, CA, 2012, pp. 1302-1305, 4 pages.

Transue, S., et al., "Real-time Tidal Volume Estimation using Iso-surface Reconstruction", 2016 IEEE First International Conference on Connected Health: Applications, Systems and Engineering Technologies (CHASE), Jun. 27, 2016, pp. 209-218, 10 pages.

Verkruysee, Wim, et al., "Calibration of Contactless Pulse Oximetry", Anesthesia & Analgesia, vol. 124, No. 1, Jan. 2017, pp. 136-145, 10 pages.

Villarroel, Mauricio, et al., "Continuous non-contact vital sign monitoring in neonatal intensive care unit", Healthcare Technology Letters, vol. 1, Issue 3, 2014, pp. 87-91, 5 pages.

(56) References Cited

OTHER PUBLICATIONS

Wadhwa, N., et al., "Phase-Based Video Motion Processing", MIT Computer Science and Artificial Intelligence Lab, Jul. 2013, 9 pages.

Wadhwa, N., et al., "Riesz pyramids for fast phase-based video magnification", In Proc. of IEEE International Conference on Computational Photography (ICCP), Santa Clara, CA, 2014, 10 pages.

Wang, W., et al., "Exploiting spatial redundancy of image sensor for motion robust rPPG", IEEE Transactions on Biomedical Engineering, vol. 62, No. 2, 2015, pp. 415-425, 11 pages.

Wu, H.Y., et al., "Eulerian video magnifcation for revealing subtle changes in the world", ACM Transactions on Graphics (TOG), vol. 31, No. 4, 2012, pp. 651-658, 8 pages.

Wulbrand, H., et al., "Submental and diaphragmatic muscle activity during and at resolution of mixed and obstructive apneas and cardiorespiratory arousal in preterm infants", Pediatric Research, No. 38(3), 1995, pp. 298-305, 9 pages.

Yu, M.C., et al., "Noncontact Respiratory Measurement of Volume Change Using Depth Camera", 2012 Annual International Conference of the IEEE Engeineering in Medicine and Biology Society, Aug. 28, 2012, pp. 2371-2374, 4 pages.

Zaunseder, et al., "Spatio-temporal analysis of blood perfusion by imaging photoplethysmography", Progress in Biomedical Optics and Imaging, SPIE—International Society for Optical Engineering, vol. 10501, Feb. 20, 2018, 15 pages.

Zhou, J., et al., "Maximum parsimony analysis of gene copy number changes in tumor phylogenetics", 15th International Workshop on Algorithms in Bioinformatics WABI 2015, Atlanta, USA, 2015, pp. 108-120, 13 pages.

Rezaei, Mahdi, et al., "DeepSOCIAL: Social Distancing Monitoring and Infection Risk Assessment in COVID-19 Pandemic", Applied Sciences, vol. 10, 7514, Oct. 26, 2020, pp. 1-29, 29 pages.

Sathyamoorthy, Adarsh Jagan, et al., "COVID-Robot: Monitoring Social Distancing Constraints in Crowded Scenarios", Aug. 21, 2020, pp. 1-11, 11 pages.

Liu, X., et al., "An Image Captioning Method for Infant Sleeping Environment Diagnosis", Springer International Publishing, May 15, 2019, pp. 18-26, 9 pages.

\* cited by examiner

SYSTEMS AND METHODS FOR IMPROVED NON-CONTACT PATIENT MONITORING OF INCUBATED NEONATES

CROSS-REFERENCE TO RELATED APPLICATION(S)

The present application claims benefit of priority to U.S. Provisional Patent Application No. 63/265,183, entitled "SYSTEMS AND METHODS FOR IMPROVED NON-CONTACT PATIENT MONITORING OF INCUBATED NEONATES" and filed on Dec. 9, 2021, which is specifically incorporated by reference herein for all that it discloses and/or teaches.

BACKGROUND

The field of non-contact patient monitoring generally includes systems and methods wherein a camera is used to obtain a video stream of a patient and data from the video stream is then used to determine one or more patient vital signs or other patient parameters. In one specific example, depth sensing cameras directed at a patient's torso can be used to determine and monitor a patient's breathing rate. Periodic or continuous monitoring of a patient in this manner can then be used to inform clinicians regarding the health status of a monitored patient, including but not limited to, triggering alarms when severe health conditions are identified. Various examples of such non-contact patient monitoring systems and methods are described in, e.g., U.S. Patent Application Publication Nos. 2019/0209046, 2019/0307365, 2019/0380599, 2019/038080, and 2020/0046302, and U.S. Pat. Nos. 10,398,353, 10,667,723 and 10,939,824.

Non-contact monitoring systems and methods have been shown to be useful and effective in monitoring adults, children and infants. However, in the case of infants, special circumstances specific to the treatment of infants may complicate and/or impede effective and accurate non-contact patient monitoring. In one example, the build-up of condensation on the internal walls of the casing of an incubator deteriorates the quality of the video stream obtained from a video camera positioned outside the incubator, and thereby reduces the accuracy of the data obtained therefrom. In severe cases, the non-contact video monitoring system fails completely and is unable to perform any monitoring functions.

Accordingly, a need exists for improved non-contact patient monitoring systems and methods for incubated neonates and other patients within transparent enclosures.

SUMMARY

This Summary is provided to introduce a selection of concepts in a simplified form that are further described below in the Detailed Description. This Summary, and the foregoing Background, is not intended to identify key aspects or essential aspects of the claimed subject matter. Moreover, this Summary is not intended for use as an aid in determining the scope of the claimed subject matter.

In some embodiments, a video-based patient monitoring method includes the steps of: obtaining a video stream of a patient located within a transparent enclosure, the video stream obtained from a non-contact detector positioned outside the transparent enclosure; periodically or continuously monitoring the quality of the video stream to detect a deterioration in the quality of the video stream; and when a deterioration in the quality of the video stream is detected, automatically initiating one or more condensation removal elements located on the transparent enclosure. The condensation removal elements can be, e.g., one or more heating elements, one or more wiper blades, etc., and are effective in removing condensation from the transparent enclosure to thereby provide an unobstructed view from the non-contact detector to the patient.

In some embodiments, a video-based patient monitoring method includes the steps of: obtaining a video stream of a patient located within a transparent enclosure, the video stream obtained from a non-contact detector positioned outside the transparent enclosure; periodically or continuously monitoring the quality of the video stream to detect a deterioration in the quality of the video stream; and when a deterioration in the quality of the video stream is detected, automatically transmitting a message to a clinician regarding the deterioration in the quality of the video stream. The message may include instructions for the clinician to manually remove condensation from the transparent enclosure to thereby provide an unobstructed view from the non-contact detector to the patient.

These and other aspects of the technology described herein will be apparent after consideration of the Detailed Description and Figures herein. It is to be understood, however, that the scope of the claimed subject matter shall be determined by the claims as issued and not by whether given subject matter addresses any or all issues noted in the Background or includes any features or aspects recited in the Summary.

BRIEF DESCRIPTION OF THE DRAWINGS

Non-limiting and non-exhaustive embodiments of the disclosed technology, including the preferred embodiment, are described with reference to the following figures, wherein like reference numerals refer to like parts throughout the various views unless otherwise specified.

DETAILED DESCRIPTION

Embodiments are described more fully below with reference to the accompanying Figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense.

Figure 1:
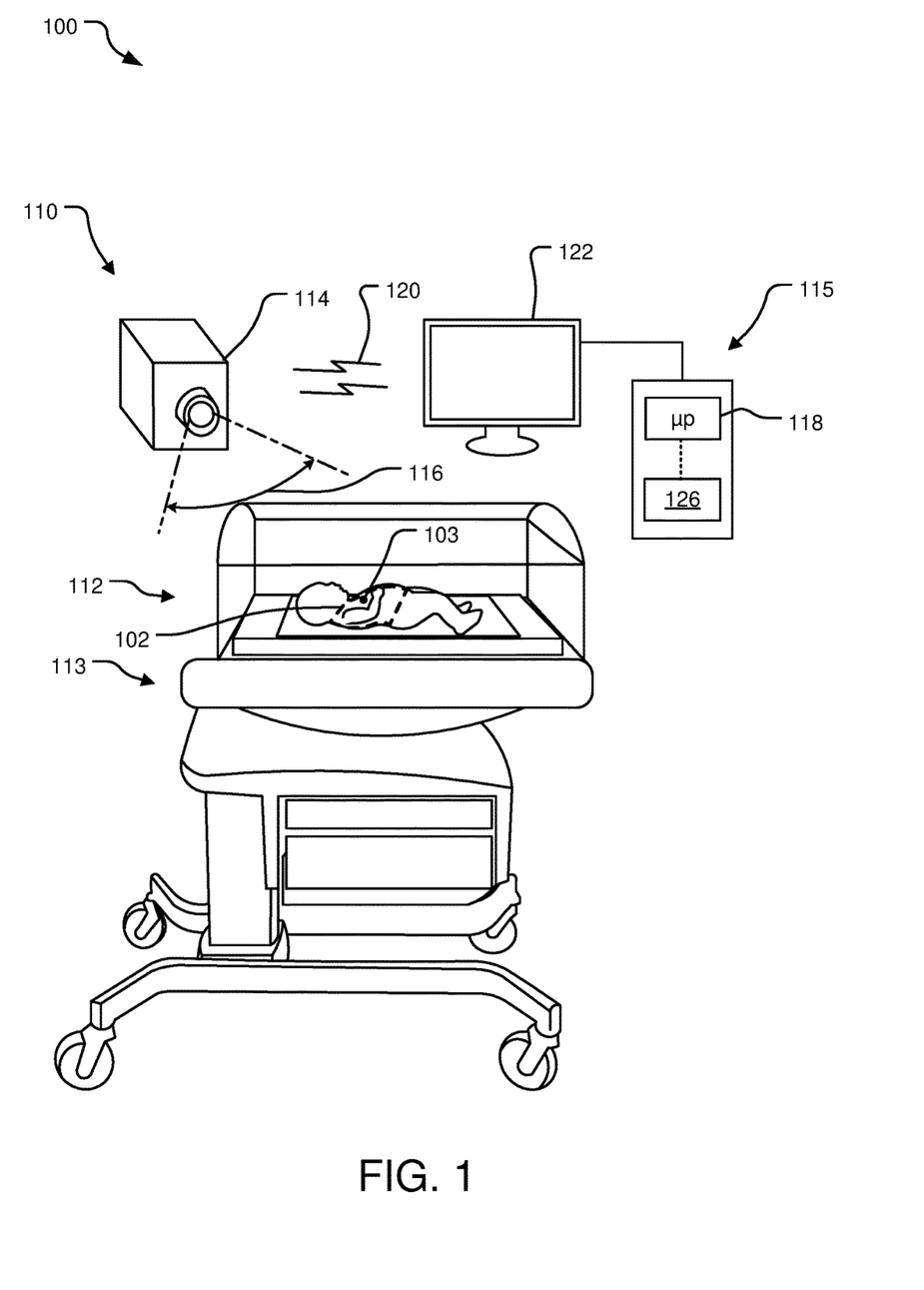
FIG. 1 is a schematic view of a video-based patient monitoring system configured in accordance with various embodiments of the presently described technology.

FIG. 1 is a schematic view of a neonatal patient 112 located inside of an incubator 113 and a video-based patient monitoring system 100 configured in accordance with various embodiments of the present technology. The system 100 includes a non-contact detector 110 and a computing device 115. In some embodiments, the detector 110 can include one or more image capture devices, such as one or more video cameras. In the illustrated embodiment, the non-contact detector 110 includes a video camera 114. The non-contact detector 110 of the system 100 is placed remote from the neonatal patient 112 and incubator 113. More specifically, the video camera 114 of the non-contact detector 110 is positioned remote from the neonatal patient 112 in that it is spaced apart from and does not contact the patient 112 or incubator 113. The camera 114 includes a detector exposed to a field of view (FOV) 116 that encompasses at least a portion of the neonatal patient 112. While FIG. 1 illustrates a neonatal patient 112 located with an incubator 113, it should be appreciated that the system 100 described herein can be used in any situation where a patient of any age is located within a transparent enclosure.

The camera 114 can capture a sequence of images over time. The camera 114 can be a depth sensing camera, such as a Kinect camera from Microsoft Corp. (Redmond, Washington) or Intel camera such as the RealSense D415, D435, and SR305 cameras from Intel Corp, (Santa Clara, California). A depth sensing camera can detect a distance between the camera and objects within its field of view. Other cameras which measures different modalities can also be used. This includes, but is not limited to, color cameras, infrared cameras and thermal cameras. Information, such as depth sensing, can be used to determine that a neonatal patient 112 is within the FOV 116 of the camera 114 and/or to determine one or more regions of interest (ROI) to monitor on the neonatal patient 112. Once a ROI is identified, the ROI can be monitored over time, and the changes in depth of regions (e.g., pixels) within the ROI 102 can represent movements of the neonatal patient 112 associated with breathing. As described in greater detail in, for example, U.S. Patent Application Publication No. 2019/0209046, those movements, or changes of regions within the ROI 102, can be used to determine various breathing parameters, such as tidal volume, minute volume, respiratory rate, respiratory, etc. Those movements, or changes of regions within the ROI 102, can also be used to detect various breathing abnormalities, as discussed in greater detail in, for example, U.S. Patent Application Publication No. 2020/0046302. The various breathing abnormalities can include, for example, low flow, apnea, rapid breathing (tachypnea), slow breathing, intermittent or irregular breathing, shallow breathing, obstructed and/or impaired breathing, and others. U.S. Patent Application Publication Nos. 2019/0209046 and 2020/0046302 are incorporated herein by reference in their entirety.

In some embodiments, the system 100 determines a skeleton-like outline of the neonatal patient 112 to identify a point or points from which to extrapolate a ROI. For example, a skeleton-like outline can be used to find a center point of a chest, shoulder points, waist points, and/or any other points on a body of the neonatal patient 112. These points can be used to determine one or more ROIs. For example, a ROI 102 can be defined by filling in an area around a center point 103 of the chest, as shown in FIG. 1. Certain determined points can define an outer edge of the ROI 102, such as shoulder points. In other embodiments, instead of using a skeleton, other points are used to establish a ROI. For example, a face can be recognized, and a chest area inferred in proportion and spatial relation to the face. In other embodiments, a reference point of a patient's chest can be obtained (e.g., through a previous 3-D scan of the patient), and the reference point can be registered with a current 3-D scan of the patient. In these and other embodiments, the system 100 can define a ROI around a point using parts of the neonatal patient 112 that are within a range of depths from the camera 114. In other words, once the system 100 determines a point from which to extrapolate a ROI, the system 100 can utilize depth information from the depth sensing camera 114 to fill out the ROI. For example, if the point 103 on the chest is selected, parts of the neonatal patient 112 around the point 103 that are a similar depth from the camera 114 as the point 103 are used to determine the ROI 102.

In another example, the neonatal patient 112 can wear specially configured clothing (not shown) that includes one or more features to indicate points on the body of the neonatal patient 112, such as the patient's shoulders and/or the center of the patient's chest. The one or more features can include visually encoded message (e.g., bar code, QR code, etc.), and/or brightly colored shapes that contrast with the rest of the patient's clothing. In these and other embodiments, the one or more features can include one or more active emitters that are configured to indicate their positions by transmitting light or other information to the camera 114. In these and still other embodiments, the one or more features can include a grid or another identifiable pattern to aid the system 100 in recognizing the neonatal patient 112 and/or the patient's movement. In some embodiments, the one or more features can be stuck on the clothing using a fastening mechanism such as adhesive, a pin, etc. For example, a small sticker can be placed on a patient's shoulders and/or on the center of the patient's chest that can be easily identified within an image captured by the camera 114. The system 100 can recognize the one or more features on the patient's clothing to identify specific points on the body of the neonatal patient 112. In turn, the system 100 can use these points to recognize the neonatal patient 112 and/or to define a ROI.

In some embodiments, the system 100 can receive user input to identify a starting point for defining a ROI. For example, an image can be reproduced on a display 122 of the system 100, allowing a user of the system 100 to select a neonatal patient 112 for monitoring (which can be helpful where multiple objects are within the FOV 116 of the camera 114) and/or allowing the user to select a point on the neonatal patient 112 from which a ROI can be determined (such as the point 103 on the chest of the neonatal patient 112). In other embodiments, other methods for identifying a neonatal patient 112, identifying points on the neonatal patient 112, and/or defining one or more ROI's can be used.

Figure 2:
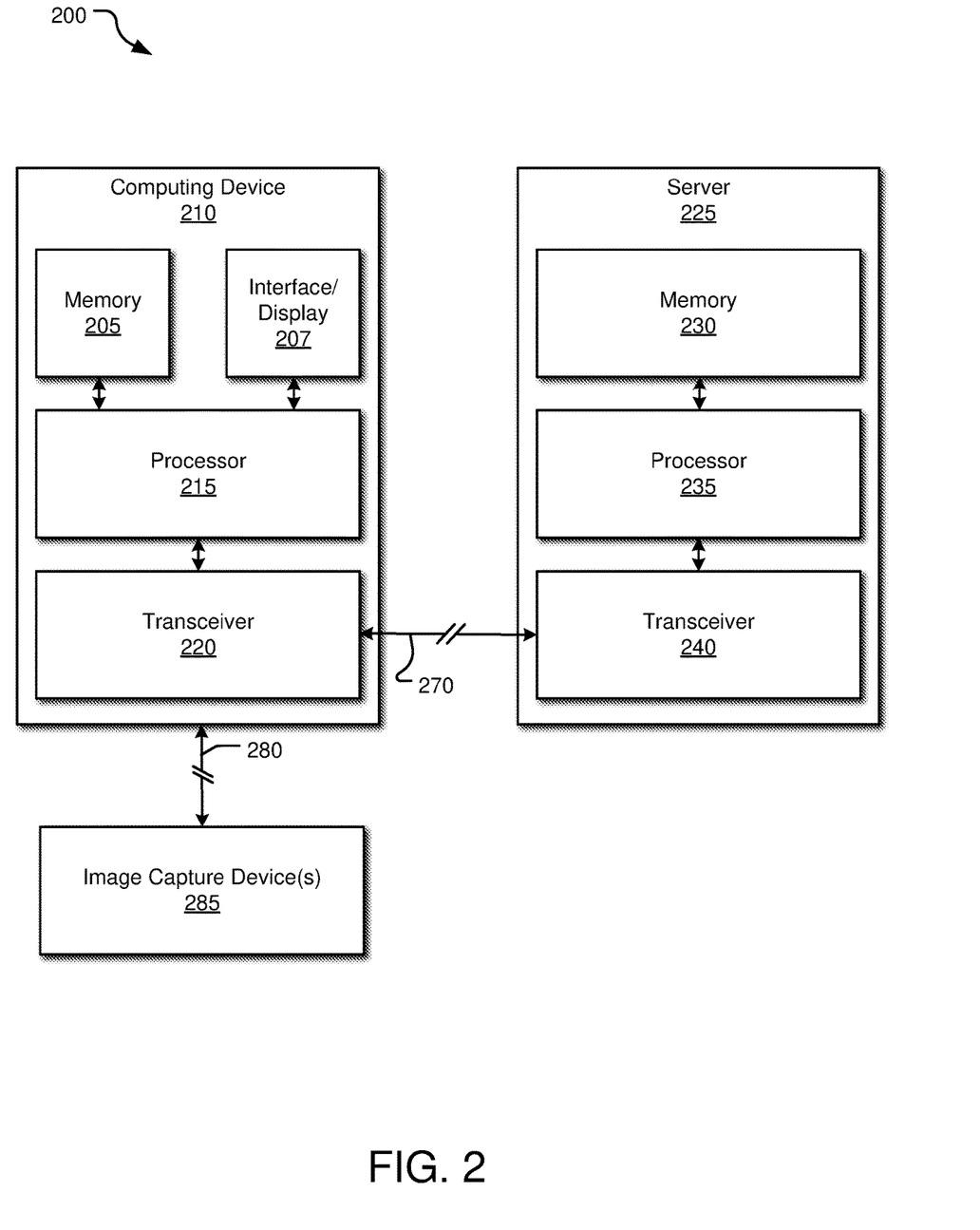
FIG. 2 is a block diagram illustrating a video-based patient monitoring system having a computing device, a server, and one or more image capturing devices, and configured in accordance with various embodiments of the presently described technology.

The images detected by the camera 114 can be sent to the computing device 115 through a wired or wireless connection 120. The computing device 115 can include a processor 118 (e.g., a microprocessor), the display 122, and/or hardware memory 126 for storing software and computer instructions. Sequential image frames of the neonatal patient 112 are recorded by the video camera 114 and sent to the processor 118 for analysis. The display 122 can be remote from the camera 114, such as a video screen positioned separately from the processor 118 and the memory 126. Other embodiments of the computing device 115 can have different, fewer, or additional components than shown in FIG. 1. In some embodiments, the computing device 115 can be a server. In other embodiments, the computing device 115 of FIG. 1 can be additionally connected to a server (e.g., as shown in FIG. 2 and discussed in greater detail below). The captured images/video can be processed or analyzed at the computing device 115 and/or a server to determine a variety of parameters (e.g., tidal volume, minute volume, respiratory rate, etc.) of a patient's breathing. In some embodiments, some or all of the processing may be performed by the camera, such as by a processor integrated into the camera or when some or all of the computing device 115 is incorporated into the camera.

FIG. 2 is a block diagram illustrating a video-based patient monitoring system 200 (e.g., the video-based patient monitoring system 100 shown in FIG. 1) having a computing device 210, a server 225, and one or more image capture devices 285, and configured in accordance with various embodiments of the present technology. In various embodiments, fewer, additional, and/or different components can be used in the system 200. The computing device 210 includes a processor 215 that is coupled to a memory 205. The processor 215 can store and recall data and applications in the memory 205, including applications that process information and send commands/signals according to any of the methods disclosed herein. The processor 215 can also (i) display objects, applications, data, etc. on an interface/display 207 and/or (ii) receive inputs through the interface/display 207. As shown, the processor 215 is also coupled to a transceiver 220.

The computing device 210 can communicate with other devices, such as the server 225 and/or the image capture device(s) 285 via (e.g., wired or wireless) connections 270 and/or 280, respectively. For example, the computing device 210 can send to the server 225 information determined about a patient from images captured by the image capture device(s) 285. The computing device 210 can be the computing device 115 of FIG. 1. Accordingly, the computing device 210 can be located remotely from the image capture device(s) 285, or it can be local and close to the image capture device(s) 285 (e.g., in the same room). In various embodiments disclosed herein, the processor 215 of the computing device 210 can perform the steps disclosed herein. In other embodiments, the steps can be performed on a processor 235 of the server 225. In some embodiments, the various steps and methods disclosed herein can be performed by both of the processors 215 and 235. In some embodiments, certain steps can be performed by the processor 215 while others are performed by the processor 235. In some embodiments, information determined by the processor 215 can be sent to the server 225 for storage and/or further processing.

In some embodiments, the image capture device(s) 285 are remote sensing device(s), such as depth sensing video camera(s), as described above with respect to FIG. 1. In some embodiments, the image capture device(s) 285 can be or include some other type(s) of device(s), such as proximity sensors or proximity sensor arrays, heat or infrared sensors/cameras, sound/acoustic or radio wave emitters/detectors, or other devices that include a field of view and can be used to monitor the location and/or characteristics of a patient or a region of interest (ROI) on the patient. Body imaging technology can also be utilized according to the methods disclosed herein. For example, backscatter x-ray or millimeter wave scanning technology can be utilized to scan a patient, which can be used to define and/or monitor a ROI. Advantageously, such technologies can be able to "see" through clothing, bedding, or other materials while giving an accurate representation of the patient's skin. This can allow for more accurate measurements, particularly if the patient is wearing baggy clothing or is under bedding. The image capture device(s) 285 can be described as local because they are relatively close in proximity to a patient such that at least a part of a patient is within the field of view of the image capture device(s) 285. In some embodiments, the image capture device(s) 285 can be adjustable to ensure that the patient is captured in the field of view. For example, the image capture device(s) 285 can be physically movable, can have a changeable orientation (such as by rotating or panning), and/or can be capable of changing a focus, zoom, or other characteristic to allow the image capture device(s) 285 to adequately capture images of a patient and/or a ROI of the patient. In various embodiments, for example, the image capture device(s) 285 can focus on a ROI, zoom in on the ROI, center the ROI within a field of view by moving the image capture device(s) 285, or otherwise adjust the field of view to allow for better and/or more accurate tracking/measurement of the ROI.

The server 225 includes a processor 235 that is coupled to a memory 230. The processor 235 can store and recall data and applications in the memory 230. The processor 235 is also coupled to a transceiver 240. In some embodiments, the processor 235, and subsequently the server 225, can communicate with other devices, such as the computing device 210 through the connection 270.

The devices shown in the illustrative embodiment can be utilized in various ways. For example, either the connections 270 and 280 can be varied. Either of the connections 270 and 280 can be a hard-wired connection. A hard-wired connection can involve connecting the devices through a USB (universal serial bus) port, serial port, parallel port, or other type of wired connection that can facilitate the transfer of data and information between a processor of a device and a second processor of a second device. In another embodiment, either of the connections 270 and 280 can be a dock where one device can plug into another device. In other embodiments, either of the connections 270 and 280 can be a wireless connection. These connections can take the form of any sort of wireless connection, including, but not limited to, Bluetooth connectivity, Wi-Fi connectivity, infrared, visible light, radio frequency (RF) signals, or other wireless protocols/methods. For example, other possible modes of wireless communication can include near-field communications, such as passive radio-frequency identification (RFID) and active RFID technologies. RFID and similar near-field communications can allow the various devices to communicate in short range when they are placed proximate to one another. In yet another embodiment, the various devices can connect through an internet (or other network) connection. That is, either of the connections 270 and 280 can represent several different computing devices and network components that allow the various devices to communicate through the internet, either through a hard-wired or wireless connection. Either of the connections 270 and 280 can also be a combination of several modes of connection.

The configuration of the devices in FIG. 2 is merely one physical system 200 on which the disclosed embodiments can be executed. Other configurations of the devices shown can exist to practice the disclosed embodiments. Further, configurations of additional or fewer devices than the devices shown in FIG. 2 can exist to practice the disclosed embodiments. Additionally, the devices shown in FIG. 2 can be combined to allow for fewer devices than shown or can be separated such that more than the three devices exist in a system. It will be appreciated that many various combinations of computing devices can execute the methods and systems disclosed herein. Examples of such computing devices can include other types of medical devices and sensors, infrared cameras/detectors, night vision cameras/detectors, other types of cameras, augmented reality goggles, virtual reality goggles, mixed reality goggle, radio frequency transmitters/receivers, smart phones, personal computers, servers, laptop computers, tablets, blackberries, RFID enabled devices, smart watch or wearables, or any combinations of such devices.

Referring back to FIG. 1, the display 122 can be used to display various information regarding the neonatal patient 112 monitored by the system 100. In some embodiments, the system 100, including the video camera 114, the computing device 115 and the processor 118, is used to obtain depth measurements and use those depth measurements to calculate respiratory volume values as described in greater detail in, for example, U.S. Patent Application Publication No. 2019/0209046. The calculated respiratory volume values can then be displayed on the display 122, such as on a graph displayed on the display 122 and in which the respiratory volume value is displayed as a function of time via a plot line.

The systems 100, 200 described above and shown in FIGS. 1 and 2 generally function most effectively when there is an unobstructed view from the non-contact detector 110 (e.g., video camera 114) to the neonatal patient 112 located within the incubator 113. As discussed previously in the Background section, obstructed views that may impact the accuracy and/or overall functionality of the systems 100, 200 can arise from the formation of condensation on the interior walls of the casing of the incubator 113. Accordingly, the systems and methods described herein are aimed primarily at preventing the formation of such condensation and/or removing such condensation after is has been formed such that systems 100, 200 can effectively operate to perform non-contact video patient monitoring functions.

Figure 3:
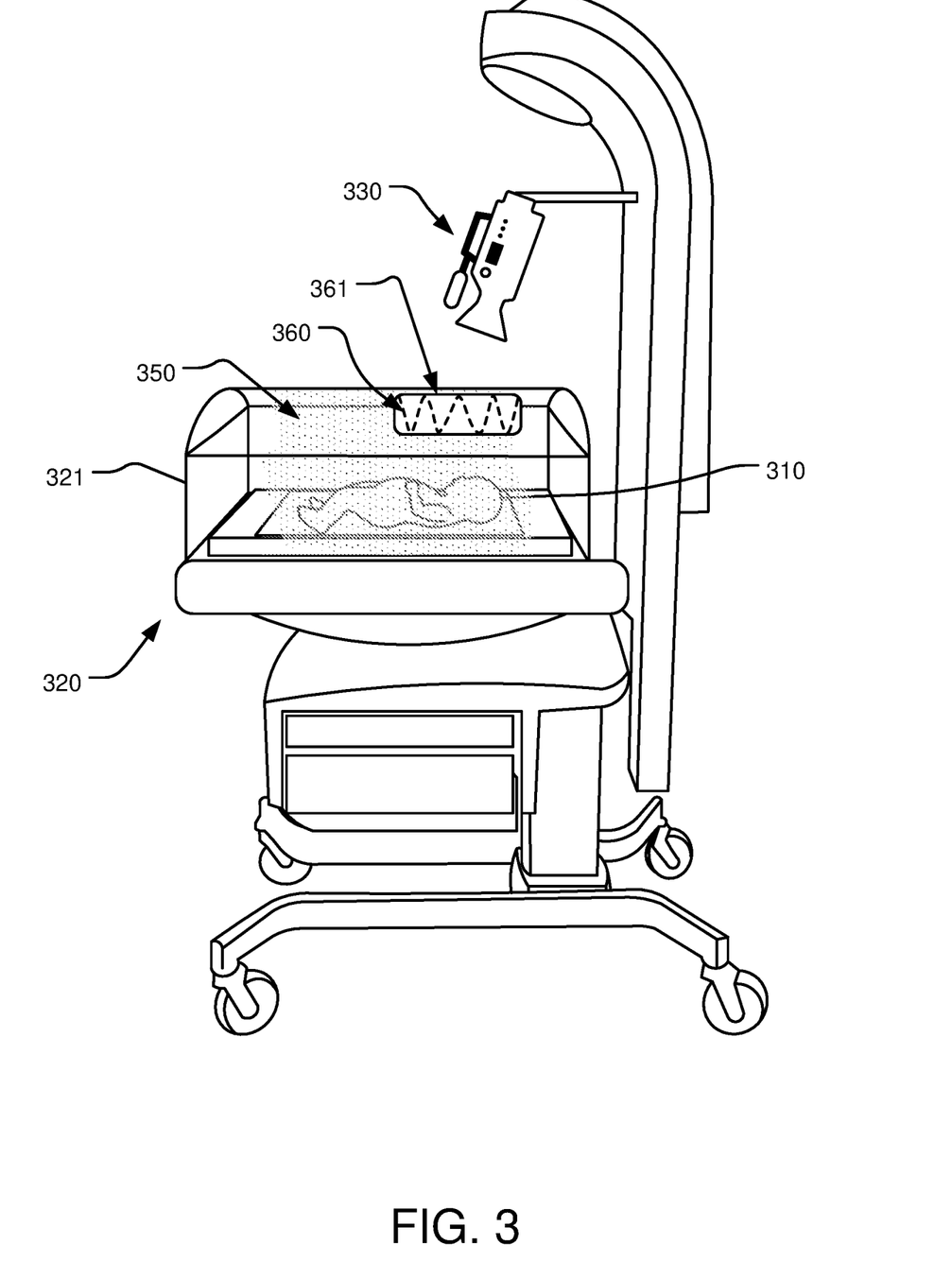
FIG. 3 is an illustration of a transparent enclosure including condensation removal elements located thereon configured in accordance with various embodiments described herein.

FIG. 3 illustrates embodiments of a non-contact video patient monitoring system configured to address instances where some or all of a transparent enclosure within which a patient is located becomes opaque due to the formation of, e.g., condensation on the internal walls of the transparent enclosure. In such scenarios, the opaque regions tend to impede a non-contact detector (e.g., a depth sensing camera positioned outside the transparent enclosure) from obtaining a high-quality video stream of the patient. In FIG. 3, a neonatal patient 310 is shown located within an incubator 320, the incubator including a transparent casing 321. A camera 330, which may be part of a system 100, 200 as described previously, is positioned above the incubator 320. The camera 330 is positioned such that the neonatal patient 310 is within the field of view of the camera 330. When the casing 321 is transparent, the camera 330 is able to produce a high-quality video stream of the neonatal patient 310, from which data can be extracted to determine and/or calculate various physiological parameters of the neonatal patient 310. In one non-limiting example, the camera 330 is a depth sensing camera that produces a video stream comprised of multiple distance measurements from the camera to various points on the body of the neonatal patient 310. A system 100 as previously described may use this distance data to calculate, for example, the respiratory rate of the neonatal patient 310.

FIG. 3 further illustrates a scenario wherein at least a portion of the internal wall of the transparent casing 321 has condensation 350 formed thereon, such as due to water vapor within the casing 321 (e.g., from neonatal patient breathing or humid-rich air ventilated within the incubator 320) condensing on the walls of the casing 321 due to temperature differences between the inside and outside of the transparent casing 321. The formation of condensation 350 on the internal walls of the casing 321 may cause some or all of the transparent casing 321 to become opaque. The opaque nature of the casing 321 subsequently creates an obstructed view between the camera 330 and the neonatal patient 310. This obstruction can deteriorate the quality of the video stream produced by the camera 330, which correspondingly can then reduce the accuracy of any patient physiological parameters calculated therefrom. In some instances, the level of condensation formed on the casing 321 can be sufficiently obtrusive as to essentially prevent obtaining a video stream including any reliable data pertaining to the neonatal patient 310, in which case a system 100 for non-contact video patient monitoring is rendered non-functional.

In order to address this issue, the incubator 320 further includes one or more condensation removal elements 360. The condensation removal elements 360 are generally located at one or more locations on the transparent casing 321 of the incubator 320 and are configured to remove condensation from the casing 321 when initiated. The condensation removal elements 360 are also communicatively coupled to the system 100 such that the system 100 may automatically control initiation and termination of the condensation removal elements 360. For example, when the system 100 detects that the video stream has reduced quality, the system 100 can automatically initiate the one or more condensation removal elements 360 to thereby remove condensation formed on transparent casing 321 and restore the quality of the video stream. The communicative coupling between the system 100 and the one or more condensation removal elements 360 can be wired or wireless.

The specific location of the condensation removal elements 360 is generally not limited, provided that the condensation removal elements 360 are positioned somewhere that allows the condensation removal elements 360 to remove condensation from the transparent casing 321 when initiated. The condensation removal elements 360 can be located on an internal or external surface of the transparent casing 321, or they may be embedded within the material of the transparent casing 321. When the condensation removal elements 360 are located on an internal or external surface of the transparent casing 321, the condensation removable elements may be repositionable. In this manner, a clinician can move the condensation removable elements 360 to an appropriate location on the transparent casing 321 depending on where the camera 330 is positioned about the incubator 320. For example, the clinician may re-position the condensation removal elements 360 to be within the field of view of the camera 330 and/or on or proximate a straight-line path extending from the camera 330 and the neonatal patient 310. This positioning helps to ensure that the condensation removal elements 360 remove condensation from casing 321 in a location that restores the transparent view between the camera 330 and the neonatal patient 310.

Alternatively, the condensation removal elements 360 may be positioned (including permanently positioned) on the casing 321 at locations where clinicians commonly position the camera 330. For example, if a common camera 330 position is directly over the top of the casing 321 as shown in FIG. 3, then one or more condensation removal elements 360 may be permanently affixed on the top portion of the casing 321.

In some embodiments, the system 100 may further include means for the position of the camera 330 to be detected or manually input into the system 100, such that the system 100 initiates only the condensation removal elements 360 corresponding to the camera's determined position when a deterioration in video quality is detected.

Any suitable type of condensation removal element can be used for the one or more condensation removal elements 360. In some embodiments, the condensation removal element 360 is a heating element that when initiated heats the area at and surrounding the condensation removal element 360. In this manner, any condensation in the area of the condensation removal element 360 is heated and evaporated to thereby remove the condensation from the casing 321. In some embodiments where the condensation removal element 360 is a heating element, the condensation removal element 360 may be in the form of a thin wire or coil. This configuration is shown in FIG. 3, where the condensation removal element 360 is a heating element in the form of a thin wire arranged in a wave-like pattern to thereby cover approximately the rectangular area surrounding the thin wire. The use of a thin wire or coil for the heating element is beneficial in that the condensation removal element 360 itself does not serve as or only minimally serves as an obstruction between the camera 330 and the neonatal patient 310.

In alternate embodiments, the condensation removal element 360 may be in the form of a wiper blade positioned on an interior surface of the casing 321. When initiated, the wiper blade pivots or otherwise moves along the interior surface of the casing 321 to wipe against the interior surface of the casing 321 and clear the area of condensation. In some embodiments, a hydrophobic coating may be applied to the wiper blade to further prevent the formation of condensation on the wiped area.

With continuing reference to FIG. 3, the condensation removal element 360 is shown as having been activated such that the condensation in the area of the condensation removal element 360 has been removed, thus creating a cleared (transparent) area 361. Provided that the condensation removal element 360 and/or camera 330 are properly aligned, the creation of the cleared area 361 provides an unobstructed path between the camera 330 and the neonatal patient 310, which can thereby lead to restoration of the video stream quality previously deteriorated by the condensation 350.

Figure 4:
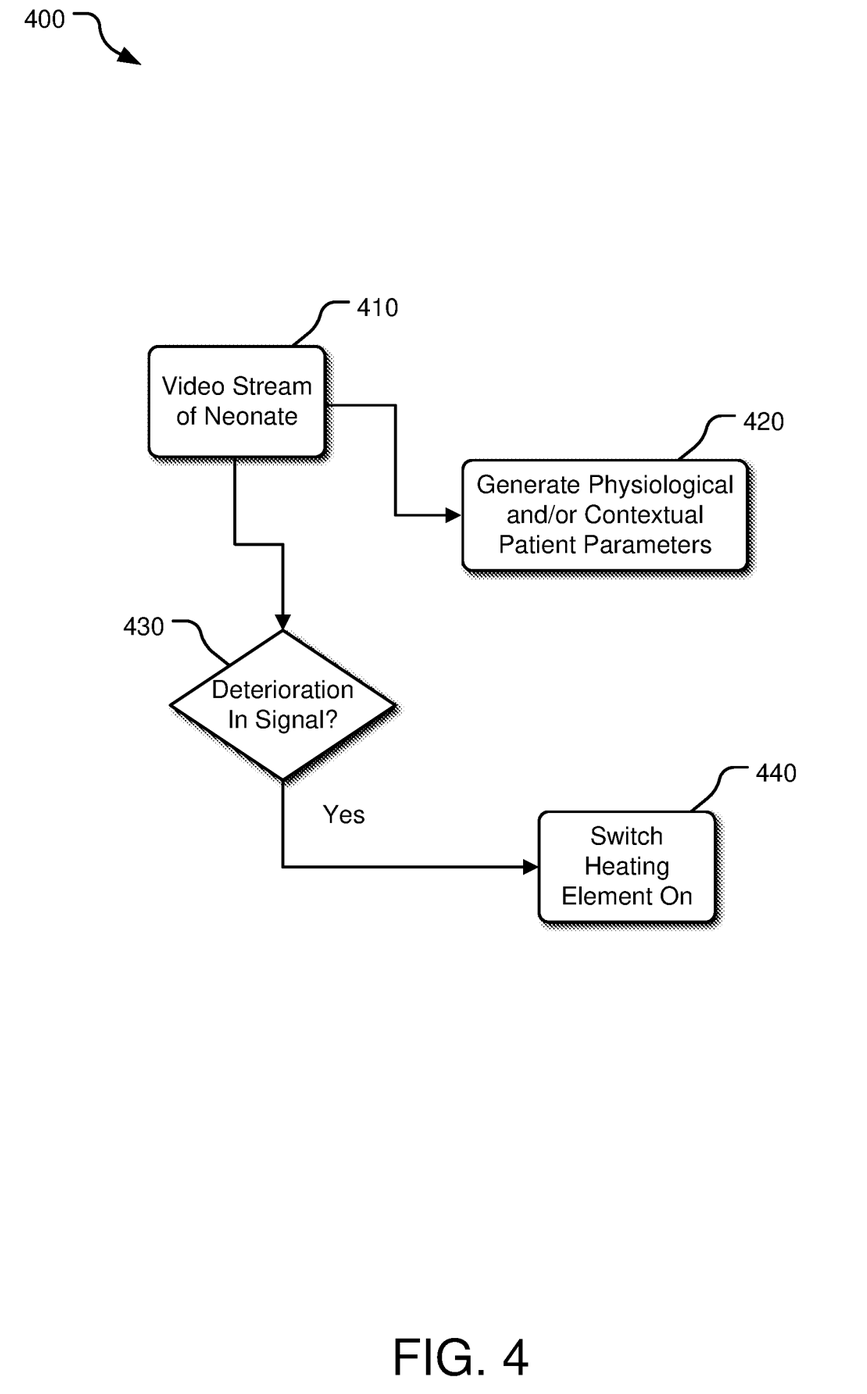
FIG. 4 is a process flow diagram illustrating a non-contact video patient monitoring method according to various embodiments described herein.

With reference now to FIG. 4, a method 400 for automatically initiating the condensation removal elements 360 upon the detection by the system 100 of certain conditions is shown. The method 400 generally includes a step 410 of obtaining a video stream of a neonatal patient, a step 420 of generating a physiological and/or contextual patient parameter using data included within the video stream, a step 430 of detecting when a deterioration in the quality of the video stream/signal occurs, and in the event that a deterioration is detected, a step 440 of initiating the one or more condensation removal elements.

With respect to steps 410 and 420 of method 400, these steps proceed as generally described previously with respect to the capabilities of systems 100, 200. For example, with respect to step 410 and obtaining a video stream of the neonatal patient, this step is generally carried out through the use of the camera 114 of system 100. As previously described, the video stream produced by the camera 114 includes data which may be used to calculate various physiological and/or contextual patient parameters. In one non-limiting example, the video stream includes depth data by virtue of the camera 114 being a depth sensing camera. System 100, such as through the use of computing device 115 and processor 118, is able to use this data to generate/calculate various parameters relating to the patient being monitored. A non-limiting example of a patient physiological parameter that can be generated based on depth data included in the video stream is patient respiratory rate. Non-limiting examples of patient contextual parameters that can be generated based on data in the video stream include the absence or presence of the patient in the camera's field of view (obtainable by analyzing, e.g., depth data), and facial recognition (obtainable by applying a facial recognition algorithm to the data in the video stream). Despite these specific examples, it should be appreciated that any physiological and/or contextual patient parameter that can be derived from various data included within the video stream can be generated at step 420.

In step 430, the method periodically or continuously checks for a deterioration in the quality of the video stream. Generally speaking, a deterioration in the quality of the video stream can be determined by analyzing whether step 420 can be successfully carried out. That is to say, when the system 100 is no longer able to generate one or more physiological and/or contextual patient parameters, this is assumed to be based on the video stream of the patient no longer providing sufficient and/or accurate data to calculate these parameters. This, in turn, is assumed to be based on a deterioration in the quality of the video stream and/or the data (or lack of data) included in the video stream. Such a deterioration in the quality of the video stream is, correspondingly, considered to be due to an obstructed view between the camera and the patient being monitored and may be caused by, for example, condensation formed on the inner surface of the casing 321.

As noted previously, step 420 may include generating any physiological and/or contextual patient parameter that may be obtained from data in the video stream obtained in step 410. Accordingly, step 430 may include checking to see whether any such physiological and/or contextual patient parameter is being successfully generated. In one non-limiting example, the physiological patient parameter being generated at step 420 is a patient respiratory rate, and thus step 430 generally includes periodically or continuously checking to ensure that the respiratory rate is being successfully generated by the system 100 based on the data in the video stream obtained at step 410. In a scenario where the system 100 is unable to generate a respiratory rate from the data in the video stream due to, for example, insufficient data, this is considered a detected deterioration in the video signal at step 430 and triggers the automatic initiation of the condensation removal elements at step 440. In another non-limiting example, the contextual patient parameter being generated at step 420 is identifying a face in the video stream using facial recognition software, and thus step 430 generally includes periodically or continuously checking to ensure that a face is being successfully recognized in the video stream using the facial recognition software employed by system 100. In a scenario where the system 100 is unable to recognize and identify a face in the video stream due to, for example, insufficient data, this is considered a detected deterioration in the video signal at step 430 and triggers the automatic initiation of the condensation removal elements at step 440.

Upon detection of a deterioration in the video signal at step 430, the system automatically initiates the condensation removal elements at step 440. As noted previously, the specific type of condensation removal element initiated at step 440 is not limited. In some embodiments, the condensation removal elements are heating elements and initiation of the heating elements involves turning the heating elements on to apply heat to the casing and thereby remove condensation present in the area proximate the heating elements. In some embodiments, the condensation removal elements are wiper blades and initiation of the wiper blades involves moving the wiper blades to thereby wipe away condensation formed on the casing.

While not shown in FIG. 4, the method 400 may further include additional periodic or continuous monitoring of the video stream quality after the initiation of a condensation removal element at step 400, with the aim of the further steps being identifying when the video stream quality has been restored. Such a step or steps may generally include periodically or continuously checking to see whether the physiological and/or contextual patient parameters are being successfully generated after it has been determined that the physiological and/or contextual patient parameters are not being successfully generated. When it is determined that the physiological and/or contextual patient parameters are again being successfully generated, this is assumed to be based on the quality of the video stream being restored by virtue of removal of the obstruction (i.e., condensation) via the initiation of the condensation removal elements. Accordingly, once the restoration of the video stream is determined in this manner, the method 400 may further include a step of automatically terminating the condensation removal elements (e.g., turning off the heating elements or stopping motion of the wiper blades).

Figure 5:
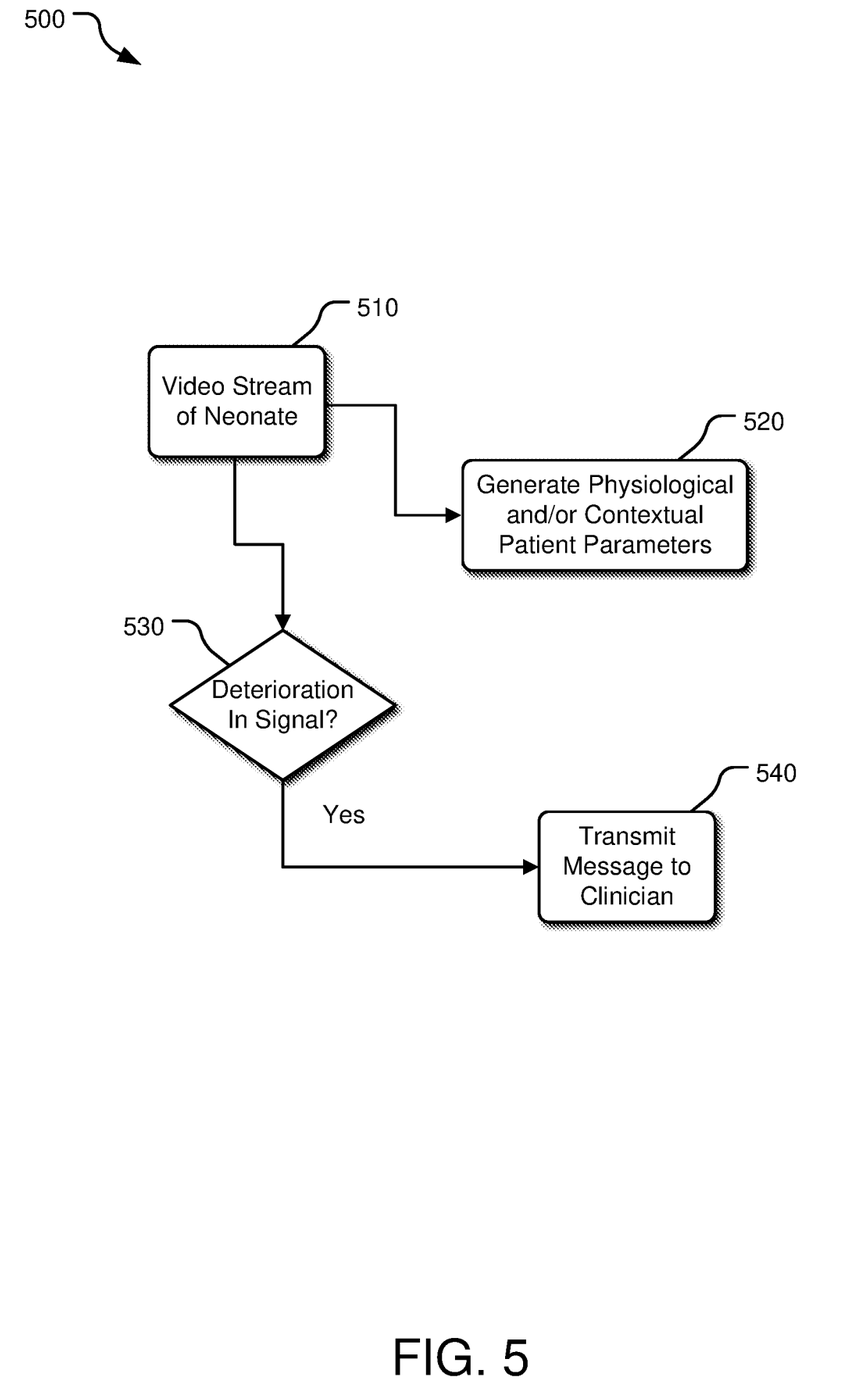
FIG. 5 is a process flow diagram illustrating a non-contact video patient monitoring method according to various embodiments described herein.

FIG. 5 illustrates a method 500 including a variation to the method 400 shown in FIG. 4. More specifically, method 500 shown in FIG. 5 replaces initiating a condensation removal element upon determination of a deteriorating video signal with transmitting a message to a clinician regarding the determination of the deterioration in the video signal. As such, steps 510, 520 and 530 are similar or identical to steps 410, 420, 430, respectively, in that a video stream of the patient is obtained at step 510 (such as through the use of a camera 114), one or more physiological and/or contextual patient parameters are generated from the data in the video stream at step 520, and whether these physiological and/or contextual patient parameters are successfully generated is periodically or continuously monitored at step 530. When step 530 reveals that a physiological and/or contextual patient parameter is not being successfully generated, step 540 entails automatically sending a message to a clinician reporting that a deterioration in the video signal has been detected. Any manner of sending the message to a clinician can be used, such as by sending an email, text, voicemail, or other alert to any type of device that is monitored by the clinician (e.g., laptop computer, desktop computer, cellular phone, tablet, pager, etc.).

The specific content of the message, alert or alarm transmitted to the clinician at step 540 is generally not limited. In some embodiments, the message includes information pertaining to the specific patient parameter that is not being successfully generated. In some embodiments, the message includes instructions for the clinician to manually remove condensation from the casing of the incubator, such as by using a cloth or handheld wiper blade (and which may optionally have a hydrophobic coating applied thereto).

While step 540 as described above generally relates to the transmission of a message, alert or alarm to clinician handheld device, it should be appreciated that step 540 could also or alternatively entail generating a local message, alarm or alert. For example, the message regarding the deterioration in the video signal could be presented on a local display associated with the system (i.e., a monitor attached to or nearby the incubator). The initiated message could also simply be an audible or visual message presented local to the patient (e.g., an alarm sounding proximate the incubator, or a flashing red light located proximate the incubator).

Also similar to method 400 described previously, method 500 may include additional steps (not shown in FIG. 5) for use in determining when the obstructed view causing the deterioration in the video signal has ended. For example, method 500 may include additional periodic and or continuous monitoring of the generating of the physiological and/or contextual patient parameter to determine when such parameters are again being successfully generated due to a restoration of the video signal. When the method 500 determines that these parameters are again being successfully generated, the method may include the additional step of sending a further message, alarm or alert providing the clinician with information on the restoration of the video signal.

In still another embodiment of the method 500, the method may further include steps pertaining to monitoring the amount of time that has elapsed after the detection of a deteriorated video signal, and taking additional remedial steps if a certain predetermined amount of time has elapsed without restoration of the video signal. For example, in the previously described embodiment of method 500 wherein method 500 further includes the steps of periodically or continuously monitoring the quality of the video stream to identify the restoration of the quality of the video stream (via, e.g., monitoring when the system is again able to generate a physiological and/or contextual patient parameter), the method 500 may employ additional steps wherein a timer is started when initial deterioration in the video signal is identified. If the timer then exceeds a predetermined amount of time before the systems detects restoration of the quality of the video signal, the method 500 may further include a step of sending a further message to the clinician regarding the sustained deterioration in the quality of the video signal. This further message to the clinician may prompt the clinician to again manually remove condensation that may not have been previously removed or which has re-formed on the casing, and/or take other steps to remove condensation different from the initial steps taken to remove condensation. For example, the clinician may use a cloth or wiper blade to remove condensation upon receipt of the first message, but may then use a cloth or wiper blade having hydrophobic coating applied thereto upon receipt of the second message.

While not shown in FIGS. 4 and 5, it should be appreciated that the methods 400, 500 could include both step 440 and 540. That is to say, in some embodiments, detection of a deterioration in the video signal may result in the system 100 both initiating a condensation removal element at step 440 and transmitting a message to the clinician at step 540.

In the above-described embodiments, it is assumed that the camera is located spaced apart from the casing of the incubator. However, it should be appreciated that in other embodiments, the lens of the camera can be placed directly against the external surface of the incubator casing or that the incubator casing may include an opening into which the lens of the camera may be disposed. In either of these alternate configurations, the systems and methods described herein may be equally applicable. For example, when the camera lens is placed directly against the incubator casing, any condensation removal elements will generally be placed proximate the location where the lens contacts the casing so that any condensation build up in that area can still be removed. In the case where an opening is provided in the casing for the camera lens to be disposed in, condensation removal elements may be located proximate or directly on the lens such that any condensation build up on the lens itself may still be removed by the systems and methods described herein.

While many of the embodiments described herein have focused on the use of a depth sensing camera and the use of depth data obtained therefrom to calculate a patient physiological and/or contextual parameter, it should be appreciated that the systems and methods described herein are not limited to the use of depth sensing cameras and depth data. Any other type of cameras suitable for collecting a type of data from which physiological and contextual parameters can be calculated or otherwise obtained can also be used in the systems and methods described herein. For example, the camera 112 in system 100 could be an RGB, IR, thermal, or any other type of camera, or a combination of two or more cameras.

From the foregoing, it will be appreciated that specific embodiments of the invention have been described herein for purposes of illustration, but that various modifications may be made without deviating from the scope of the invention. Accordingly, the invention is not limited except as by the appended claims.

Although the technology has been described in language that is specific to certain structures and materials, it is to be understood that the invention defined in the appended claims is not necessarily limited to the specific structures and materials described. Rather, the specific aspects are described as forms of implementing the claimed invention. Because many embodiments of the invention can be practiced without departing from the spirit and scope of the invention, the invention resides in the claims hereinafter appended.

Unless otherwise indicated, all number or expressions, such as those expressing dimensions, physical characteristics, etc., used in the specification (other than the claims) are understood as modified in all instances by the term "approximately". At the very least, and not as an attempt to limit the application of the doctrine of equivalents to the claims, each numerical parameter recited in the specification or claims which is modified by the term "approximately" should at least be construed in light of the number of recited significant digits and by applying rounding techniques. Moreover, all ranges disclosed herein are to be understood to encompass and provide support for claims that recite any and all sub-ranges or any and all individual values subsumed therein. For example, a stated range of 1 to 10 should be considered to include and provide support for claims that recite any and all sub-ranges or individual values that are between and/or inclusive of the minimum value of 1 and the maximum value of 10; that is, all sub-ranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth).

We claim:

1. A video-based patient monitoring method, comprising:
   obtaining a video stream of a patient located within a transparent enclosure, the video stream obtained from a non-contact detector positioned outside the transparent enclosure;
   periodically or continuously monitoring the quality of the video stream to detect a deterioration in the quality of the video stream;
   when a deterioration in the quality of the video stream is detected, automatically initiating one or more condensation removal elements located on the transparent enclosure;
   after automatically initiating the one or more condensation removal elements located on the transparent enclosure, periodically or continuously monitoring the quality of the video stream to detect a restoration in the quality of the video stream; and
   when a restoration in the quality of the video stream is detected, automatically terminating the one or more condensation removal elements located on the transparent enclosure.

2. The video-based patient monitoring method of claim 1, wherein the non-contact detector is a depth sensing camera.

3. The video-based patient monitoring method of claim 1, wherein monitoring the quality of the video stream to detect a deterioration in the quality of the video stream comprises at least one of monitoring whether a video analysis of the video stream can be successfully completed or monitoring whether a physiological parameter of the patient can be successfully calculated from the data within the video stream.

4. The video-based patient monitoring method of claim 3, wherein detection of a deterioration in the quality of the video stream occurs when at least one of a video analysis of the video stream cannot be successfully completed or a physiological parameter of the patient cannot be successfully calculated from the data within the video stream, or both.

5. The video-based patient monitoring method of claim 4, wherein video analysis of the video stream comprises detecting a patient's face using a facial recognition algorithm.

6. The video-based patient monitoring method of claim 1, wherein the one or more condensation removal elements are located on the transparent enclosure such that the condensation removal elements are within a field of view of the non-contact detector.

7. The video-based patient monitoring method of claim 1, wherein the one or more condensation removal elements are located on the transparent enclosure such that the condensation removal elements are located on or proximate a straight-line path extending from the non-contact detector and the patient.

8. The video-based patient monitoring method of claim 1, wherein monitoring the quality of the video stream to detect a restoration in the quality of the video stream comprises at least one of monitoring whether a video analysis of the video stream can be successfully completed or monitoring whether a physiological parameter of the patient can be successfully calculated from the data within the video stream.

9. The video-based patient monitoring method of claim 8, wherein detection of a restoration in the quality of the video stream occurs when at least one of a video analysis of the video stream can be successfully completed or a physiological parameter of the patient can be successfully calculated from the data within the video stream.

10. The video-based patient monitoring method of claim 9, wherein video analysis of the video stream comprises detecting a patient's face using a facial recognition algorithm.

11. The video-based patient monitoring method of claim 1, wherein the one or more condensation removal elements are heating elements.

12. The video-based patient monitoring method of claim 11, wherein the heating elements are embedded within the transparent enclosure.

13. The video-based patient monitoring method of claim 1, wherein the one or more condensation removal elements are wiper blades, optionally having a hydrophobic coating applied thereon.

14. The video-based patient monitoring method of claim 1, further comprising transmitting a message regarding the deterioration in the quality of the video stream.

15. The video-based patient monitoring method of claim 14, further comprising displaying the message on a handheld device.

16. The video-based patient monitoring method of claim 14, further comprising presenting the message on a local display.

17. The video-based patient monitoring method of claim 16, wherein the message comprises an alarm or flashing light proximate the transparent enclosure.

18. A video-based patient monitoring method, comprising:
   obtaining a video stream of a patient located within a transparent enclosure, the video stream obtained from a non-contact detector positioned outside the transparent enclosure;
   periodically or continuously monitoring the quality of the video stream to detect a deterioration or a restoration in the quality of the video stream;
   when a deterioration in the quality of the video stream is detected, automatically initiating one or more condensation removal elements located on the transparent enclosure; and
   when a restoration in the quality of the video stream is detected, automatically terminating the one or more condensation removal elements located on the transparent enclosure.

19. The video-based patient monitoring method of claim 18, wherein the non-contact detector is a depth sensing camera.

20. The video-based patient monitoring method of claim 18, further comprising transmitting a message regarding the deterioration in the quality of the video stream.

* * * * *